Sept. 22, 1931.  E. V. CULLEN ET AL  1,824,196
TRUCK FOR ROTATABLY MOUNTED STRUCTURES
Filed Nov. 11, 1929  7 Sheets-Sheet 1

Sept. 22, 1931. E. V. CULLEN ET AL 1,824,196
TRUCK FOR ROTATABLY MOUNTED STRUCTURES
Filed Nov. 11, 1929 7 Sheets-Sheet 4

Inventor
Edward V. Cullen &
Albert G. A. Schmidt
By Fred Gerlach Atty.

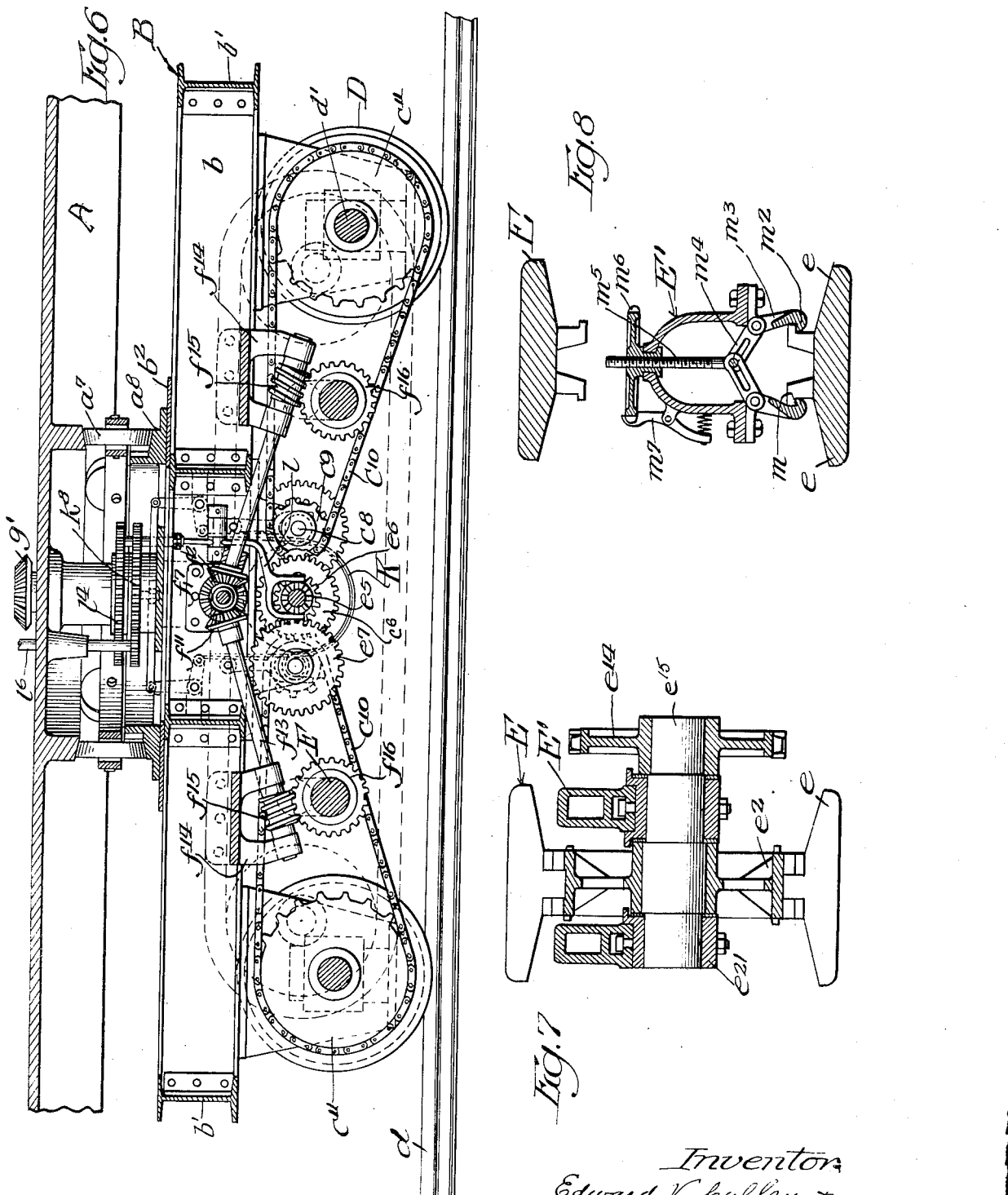

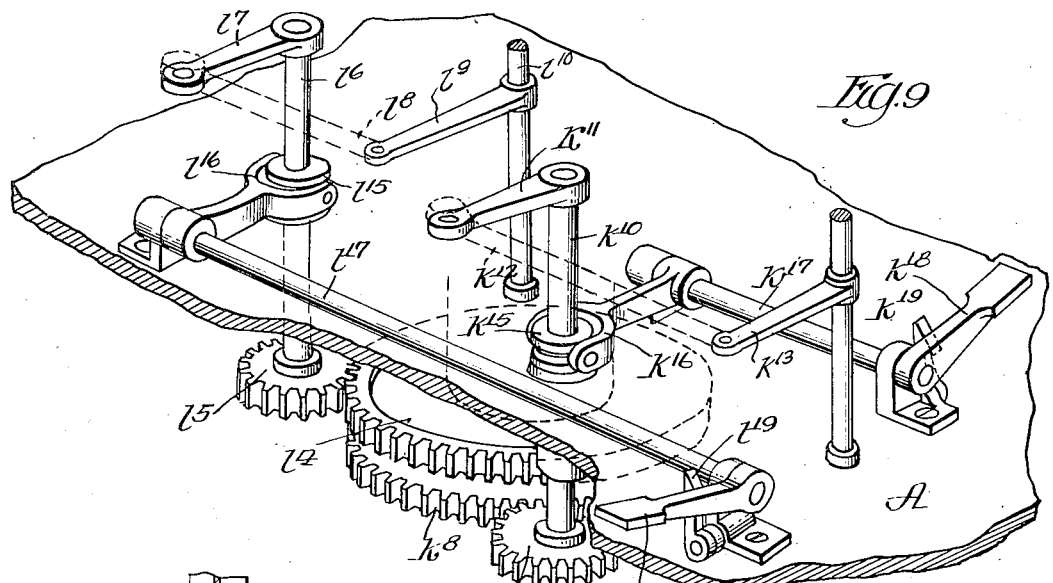
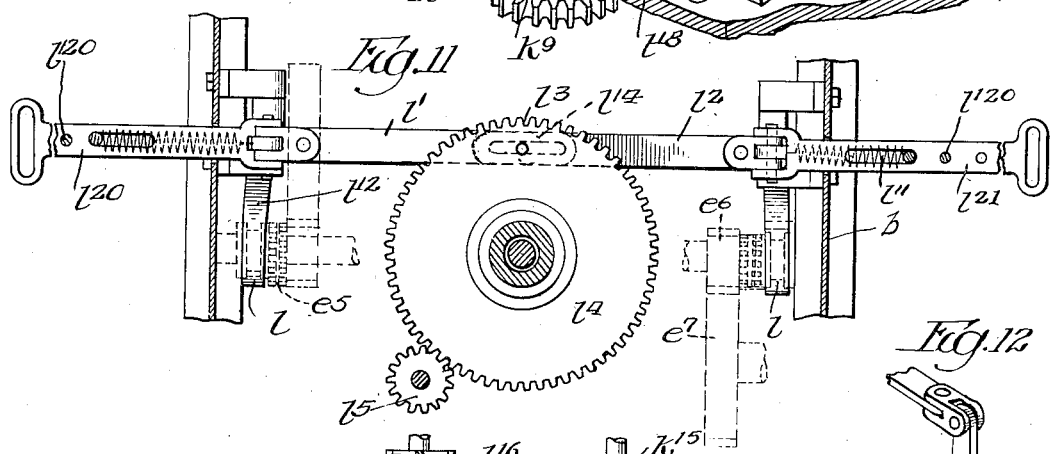
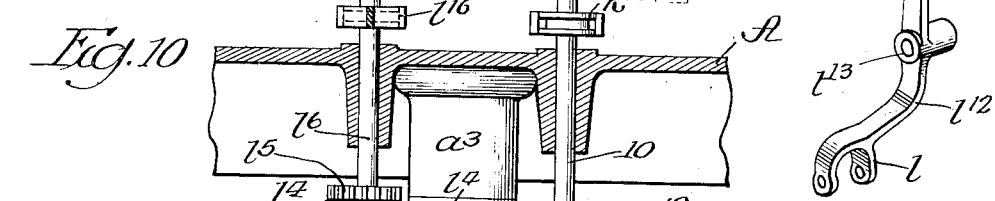

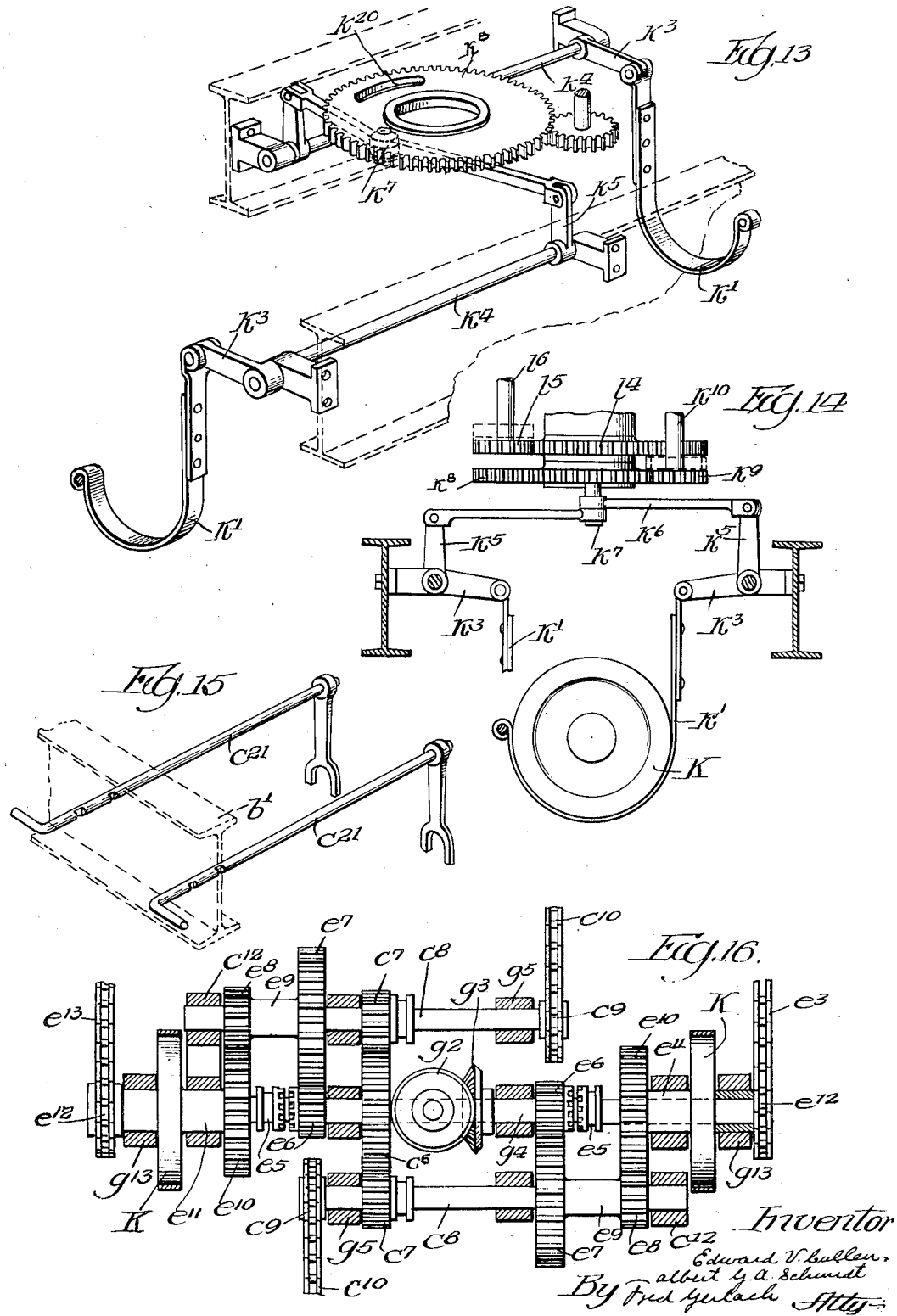

Patented Sept. 22, 1931

1,824,196

UNITED STATES PATENT OFFICE

EDWARD V. CULLEN AND ALBERT G. A. SCHMIDT, OF CHICAGO, ILLINOIS, ASSIGNORS TO CULLEN-FRIESTEDT COMPANY, OF CHICAGO, ILLINOIS, A CORPORATION OF ILLINOIS

TRUCK FOR ROTATABLY MOUNTED STRUCTURES

Application filed November 11, 1929. Serial No. 406,362.

The invention relates generally to trucks. More particularly the invention relates to that type of truck which embodies a rotatable deck or table and is adapted for use in connection with a structure such as a derrick, crane, shovel, drag line, hoe or pile driver.

One object of the invention is to provide a truck of the aforementioned type which is equipped with traction wheels which are adapted to run on rails, and is also equipped with crawlers or creepers which are adapted to run on the ground, so that the structure with which the truck is associated may be operated over a track or in places where no track has been laid.

Another object of the invention is the provision of mechanism for driving the traction wheels and the crawlers from an engine or motor that is mounted on the rotatable deck or table.

A further object of the invention is to provide a truck of the type under consideration, in which the crawlers are vertically adjustable relatively to the truck-frame, so that either the traction wheels or the crawlers may be rendered operative to carry and propel the structure that is mounted on the deck or table.

Other objects of the invention and the various advantages and characteristics of the present truck construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 6 is a longitudinal section taken on the line 6—6 of Figure 4;

Figure 7 is a detail section taken on the line 7—7 of Figure 2 and showing the sprocket wheel for driving one of the crawlers;

Figure 8 is a detail section taken on the line 8—8 of Figure 2;

Figure 9 is a perspective view of the mechanism for controlling the crawlers and the crawler brakes from the rotatable deck;

Figure 10 is a transverse sectional view illustrating in detail the mechanism whereby the crawlers are controlled for conjoint or independent operation;

Figure 11 is a detailed plan view of the crawler controlling mechanism;

Figure 12 is a detail perspective view of one of the clutch shifting levers that is used in connection with the crawler controlling mechanism;

Figure 13 is a perspective view of the mechanism for controlling the crawler brakes;

Figure 14 is a side elevational view of the brake mechanism;

Figure 15 is a perspective view of the mechanism for controlling the operation of the traction wheels; and Figure 16 is a plan view of the various gear trains that are used in connection with the drive of the crawlers and the traction wheels.

Figure 1:
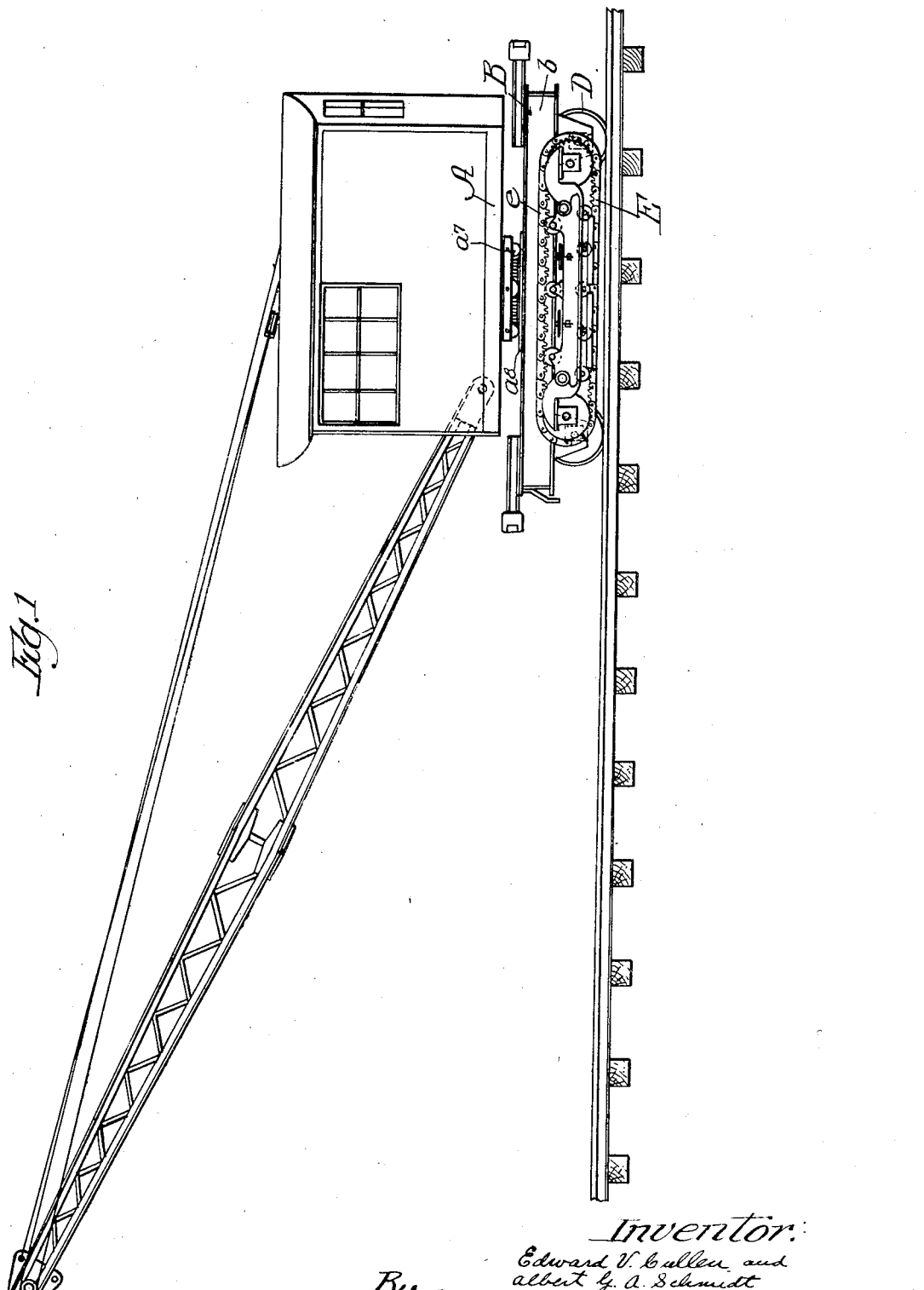
Figure 1 is a view in side elevation disclosing a truck embodying the invention, together with a derrick on the rotatable deck.
Figure 2:
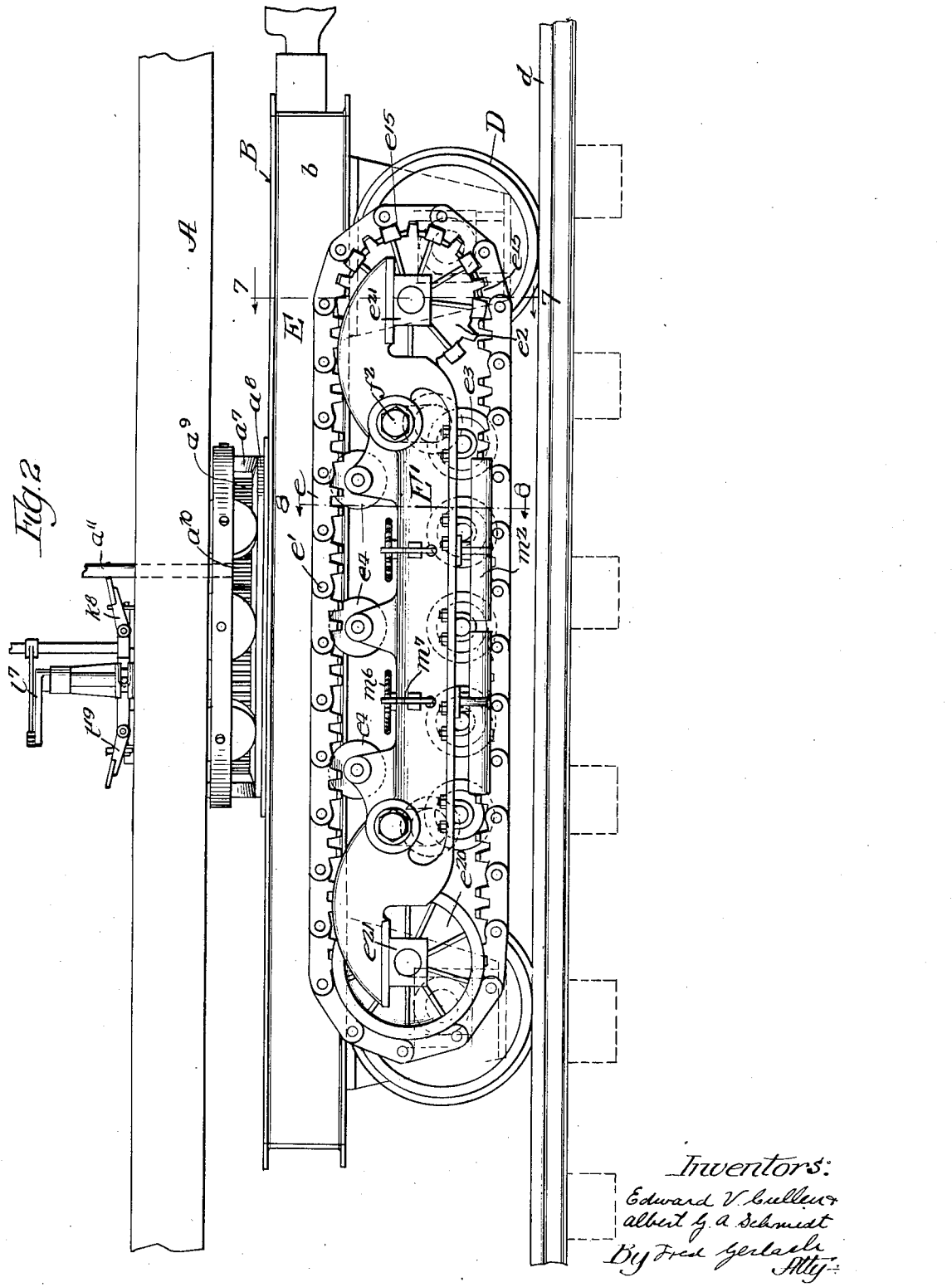
Figure 2 is a side elevation of the truck on a larger scale.
Figure 3:
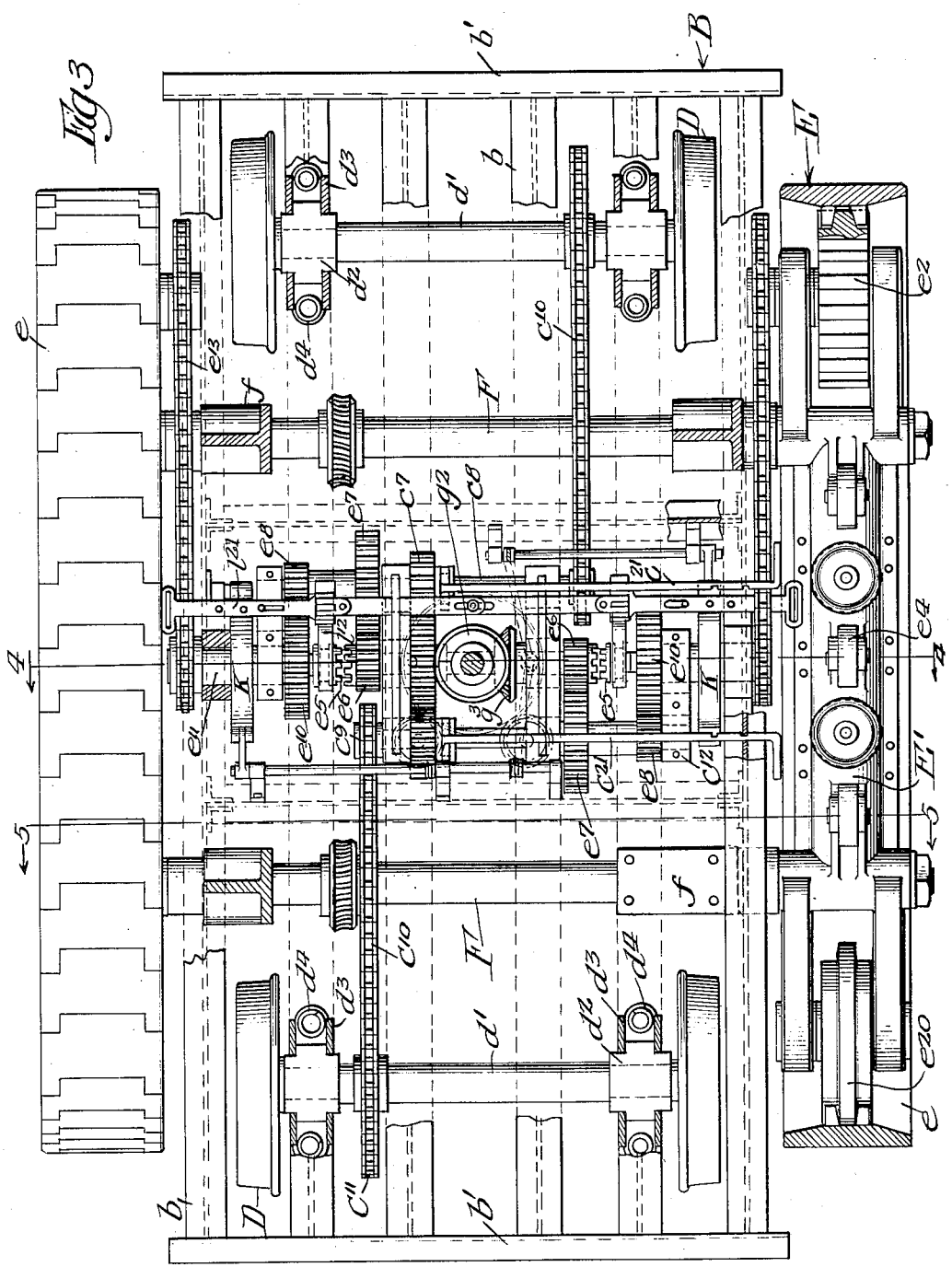
Figure 3 is a plan view of the frame structure of the truck, parts being omitted and parts being shown in section for purposes of illustration.
Figure 4:
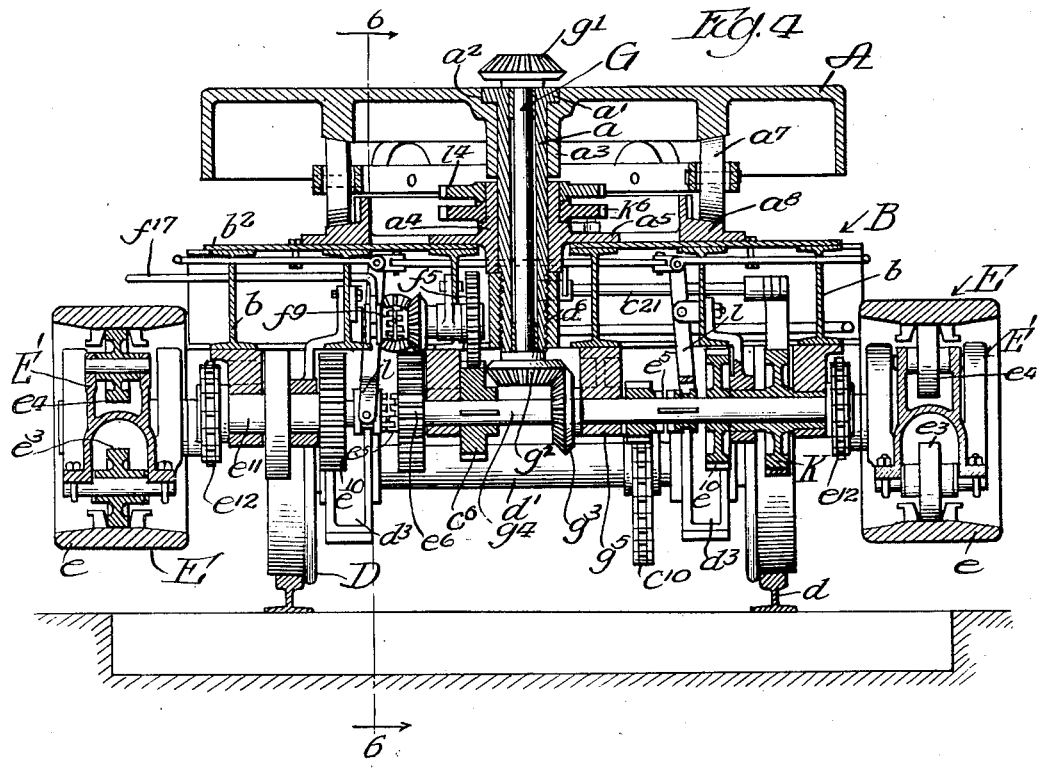
Figure 4 is a transverse section taken on the line 4—4 of Figure 3.
Figure 5:
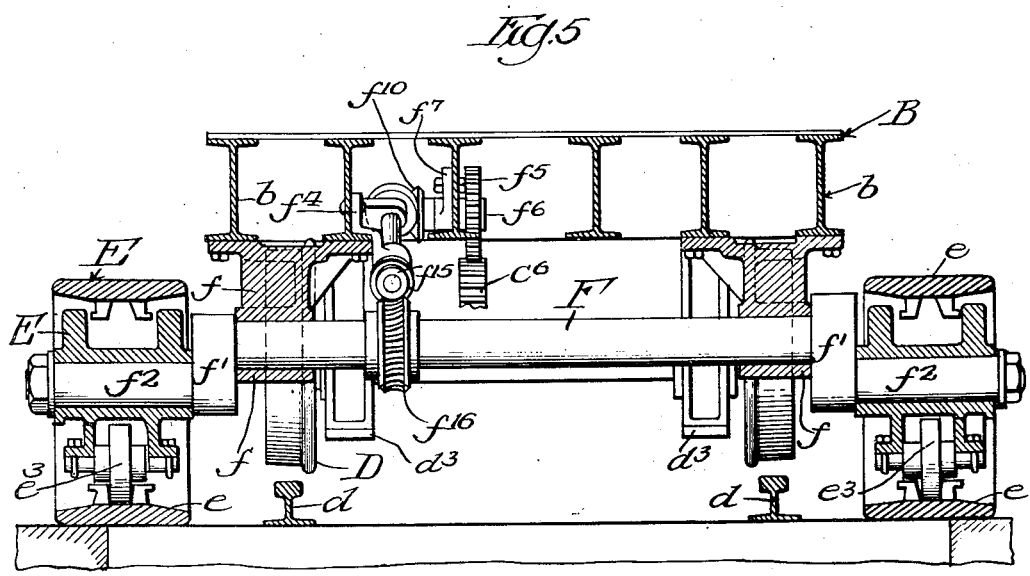
Figure 5 is a transverse section taken on the line 5—5 of Figure 3.

The truck which forms the subject matter of the invention comprises a horizontally extending deck or table A which is adapted to support a structure such, for example, as a derrick, crane, shovel, drag line, hoe or pile driver. For purposes of illustration the deck is shown in connection with a derrick and an engine for operating the hoisting mechanism of the derrick. The truck, in addition to the deck A, comprises a carriage B which supports the deck so that it is rotatable horizontally; flanged traction-wheels D for sustaining and propelling the carriage when rails are available; crawlers or creepers E for supporting the carriage and propelling the same over ground where no rails are laid; and mechanism for raising and lowering the crawlers so the carriage may be supported and driven, either by the traction-wheels or the crawlers.

The carriage B comprises a frame which is composed of longitudinal beams $b$, transverse beams $b'$ and a floor plate $b^2$. The beams and plate may be formed either of cast or structural steel and are secured rigidly together. The traction-wheels D are adapted to run on rails $d$ and are secured together in pairs by axles $d'$ which are mounted in journal boxes $d^2$. The latter are held in pedestals $d^3$ which are fixed to the underside of the truck beams $b$. Cushion springs $d^4$ are interposed between the pedestals $d^3$ and the journal boxes $d^2$.

The crawlers E are disposed at the sides of the carriage. Each of the crawlers comprises an endless series of shoes or links $e$ which form treads and are pivotally connected together by pins $e'$. Each series of shoes travels around a sprocket wheel $e^2$ and an idler wheel $e^{20}$ which are journalled in boxes $e^{21}$ at the ends of a pair of frame-members E'. The shoes of the lower reaches of the crawlers engage rollers $e^3$ which are disposed between the wheels $e^2$ and $e^{20}$ and are mounted on the lower parts of the frame-members E'. The shoes of the upper reaches of the crawlers are supported between the wheels $e^2$ and $e^{20}$ by rollers $e^4$ which are mounted on the upper parts of the frame-members E'. The frame-members E' are connected to the frame of the carriage by a pair of crank-axles F. Each of these axles is journalled in a pair of bearings $f$ and has at the ends thereof cranks $f'$ and studs $f^2$ which project outwardly from the cranks and extend through and are journalled in bearings in the frame-members E'. The cranks are arranged in parallel relation so that conjoint rotation of the axles F will raise or lower the ends of both crawlers equidistantly relatively to the carriage frame and traction-wheels. The bearings $f$ for the crank-axles are secured to and depend from the beams $b$.

The deck A is rotatably connected to the carriage by a vertically extending sleeve $a$ which is provided at the upper end thereof with an annular shoulder $a'$. The latter is seated in a groove $a^2$ in a hub $a^3$ which is rigid with the deck. The sleeve $a$ extends through the hub $a^4$ of a ring $a^5$. This ring is rigidly secured to the floor plate $b^2$ of the carriage-frame and is held against upward displacement by a nut $a^6$ which is threaded to the lower end of the sleeve. Rollers $a^7$ are mounted on the deck and ride on a circular track $a^8$ on the ring $a^5$. These rollers serve to support rotatably the deck and the structure or derrick which is associated therewith. A gear-ring $a^9$ is formed on the ring $a^5$ and is engaged by a pinion $a^{10}$ which is mounted on a vertical shaft $a^{11}$. The latter is carried by the deck and may be driven from the engine on the deck to rotate the deck relatively to the carriage into any desired position.

The flanged traction wheels D and the crawlers E are adapted to be driven to propel the truck together with the structure or derrick thereon, by means of an engine (not shown) on and rotatable with the deck. For the purpose of effecting drive of the wheels and crawlers from the deck, a vertical drive-shaft G is mounted concentrically with respect to the axis of the deck and is journalled in the sleeve $a$. A bevelled gear $g'$ is fixed to the upper end of the shaft G and is adapted to be driven by any suitable gearing which revolves with the deck. A bevelled gear $g^2$ is fixed to the lower end of the shaft G below the sleeve $a$ and meshes with a bevelled gear $g^3$ which is fixed to and drives a transverse drive-shaft $g^4$. The latter is journalled in hangers $g^5$ which are fixed to the beams $b$ of the carriage-frame. The mechanism for driving the traction-wheels D and the mechanism for driving the crawlers are adapted to be driven from the shaft $g^4$.

The mechanism for driving the traction wheels comprises a gear $c^6$ which is fixed to the shaft $g^4$; and two sets of gearing between the gear $c^6$ and the wheel axles $d'$. Each set of gearing comprises a gear $c^7$ which is splined to a countershaft $c^8$ and is slidable into and out of mesh with the gear $c^6$; a sprocket wheel $c^9$ which is fixed to the shaft $c^8$; a chain $c^{10}$ which is driven by the sprocket $c^9$; and a sprocket wheel $c^{11}$ which is fixed to one of the axles $d'$. The countershafts $c^8$ are disposed at opposite sides of the shaft $g^4$ and are journalled in the hangers $g^5$ and in hangers $c^{12}$ which are fixed to the beams $b'$. The aforementioned sets of gearing exemplify traction wheel driving mechanism which is adapted to be driven from a motor which is mounted on the rotatable deck, and through a vertical shaft around which the deck turns. When the gears $c^7$ of the sets of gearing are shifted out of mesh with the gear $c^6$, the traction wheels are disconnected with respect to the drive shaft $g^4$ and are not adapted to be driven from the motor on the deck.

The crawlers are adapted to be driven conjointly or individually by mechanisms which are similar in construction. Each of these mechanisms comprises a clutch-member $e^5$ which is splined to and slidable on the shaft $g^4$, a pinion $e^6$ which is loosely mounted on the shaft $g^4$; a gear $e^7$ which meshes with the pinion $e^6$ and is loosely mounted on one of the countershafts $c^8$; a pinion $e^8$ which is connected to the gear $e^7$ by a sleeve $e^9$; a gear $e^{10}$ which meshes with the pinion $e^8$ and is fixed to a sleeve $e^{11}$ which is loosely mounted on the shaft $g^4$ and is journalled in the hanger $c^{12}$ and in a hanger $g^{13}$; a sprocket wheel $e^{12}$ which is rigid with the outer end of the sleeve $e^{11}$; a chain $e^{13}$ which is driven by the sprocket wheel $e^{12}$; and a sprocket wheel $e^{14}$ which is fixed to the shaft $e^{15}$ of the drive sprocket $e^2$. When both clutch-members $e^5$ are coupled to the pinions $e^6$, both crawlers will be driven to propel the truck in a straight direction. By uncoupling one of the clutch-members $e^5$ from its pinion $e^6$, the truck may be turned around a corner. A brake drum K is fixed to each sleeve $e^{11}$ for engagement with a brake band $k'$, one end of which is connected to the carriage-frame, and the other end of which is connected to a controlling device hereinafter described. By applying the brake to one of the brake drums K, one of the crawlers may be locked while the other is driven in order to steer the truck during use of the crawlers. The drive mechanisms for the crawlers exemplify means for driving the crawlers from the shaft G which is driven by the engine on the rotatable deck.

The crank-shafts F which connect the frame-members E' to the carriage B, are adapted to raise the crawlers off the ground while the truck is supported on the rails $d$ and to lower the crawlers to carry the truck and hold the wheels off the rails or ground, and are conjointly rotatable by power from the shaft $g^4$. The mechanism for rotating the crank-shafts comprises a gear $f^5$ which meshes with the gear $c^6$; a shaft $f^6$ which is supported in a bearing bracket $f^7$ and fixedly secured to the gear $f^5$; a clutch member $f^9$ which is splined to and slidable on the shaft $f^6$; a bevelled gear $f^{10}$ which is loosely mounted on the shaft $f^6$ and is provided with clutch-teeth for engagement with the member $f^9$; a pair of bevelled gears $f^{11}$ and $f^{12}$ which mesh with the gear $f^{10}$ and are fixed respectively to a pair of longitudinally extending shafts $f^{13}$ which are mounted in the bracket $f^7$ and in brackets $f^{14}$; worms $f^{15}$ which are fixed to the shafts $f^{13}$; and worm gears $f^{16}$ which mesh with the worms $f^{15}$ and are fixed on the crank-shafts F. This mechanism is adapted to rotate both crank-shafts in the same direction so the cranks $f'$ will retain the crawlers horizontally in all positions of the cranks and will be rotated back and forth through an arc of 180°. The cranks are arranged to travel so that the chains $e^{13}$ will be slackened during the movement of the cranks between their upper and lower positions. The crawler raising and lowering mechanism is controlled by a push rod $f^{17}$ which is slidable through the beams $b'$ and has a fork that is adapted to shift clutch-member $f^9$ on the shaft $f^6$ to couple said member to, and uncouple it from, the bevelled gear $f^{10}$.

The gears $c^7$ for driving the traction wheels are connected to controller rods $c^{21}$ which are slidably mounted in the carriage-frame and have forks for sliding these gears on shafts $c^8$ to control the operation of the traction wheels. When gears $c^7$ and $c^6$ are in mesh, the traction wheels will be driven to propel the truck, and when they are out of mesh, the traction wheels will be idle. Rods $c^{21}$ are extended to one side of the truck-frame and are provided with handles at their outer ends. The shaft $g$ is usually driven through reversing gearing or a reversible engine on the deck to drive the shaft $g$ in either direction, so that the driving mechanisms for the traction wheels and the crawlers may be driven in either direction to propel correspondingly the truck.

The mechanism for shifting the clutches $e^5$ to control the separate or conjoint driving of the crawlers, comprises a pair of forks $l$ which extend into grooves in said clutches and are mounted on levers $l^{12}$ which are centrally fulcrumed at $l^{13}$; a pair of links $l'$ and $l^2$ which are pivoted respectively to the upper ends of the levers $l^{12}$, and have their inner ends connected to a stud $l^3$; a gear $l^4$ which is rotatable on the hub $a^4$ of the ring $a^5$, and to which the stud $l^3$ is fixed; a pinion $l^5$ which is adapted to mesh with the gear $l^4$; a vertical shaft $l^6$ to the lower end of which the pinion $l^5$ is secured, the shaft being vertically slidable so the pinion may be shifted into and out of mesh with the gear $l^4$; a crank $l^7$ which is fixed to the upper end of the shaft $l^6$; a link $l^8$ which is pivoted to the outer end of the crank $l^7$; and a lever $l^9$ which is pivoted on a pin $l^{10}$ which is mounted on the deck A. Springs $l^{11}$ are applied to the forks $l$ and normally hold the clutches $e^5$ coupled to the gears $c^6$. The links $l'$ and $l^2$ are each provided with a slot $l^{14}$. As a result the stud $l^3$ may be moved to shift either the link $l'$ or the link $l^2$ inwardly and consequently it is possible to drive the crawlers separately. When the deck A is to be rotated to swing the superincumbent structure or derrick, the pinion $l^5$ is disengaged from the gear $l^4$. Shift of the pinion is effected by mechanism comprising a grooved collar $l^{15}$ which is fixed to the shaft $l^6$; a fork $l^{16}$ which is fixed to a rock-shaft $l^{17}$ which is pivotally mounted on the deck; and a treadle $l^{18}$ for rocking the shaft. A latch $l^{19}$ has its lower end pivoted to the deck and is adapted to hold the treadle $l^{18}$ in its lowered position to hold the shaft $l^6$ in its raised position, at which time the pinion $l^5$ will be disengaged from the gear $l^4$. When the lever $l^9$ is in its neutral position and the treadle $l^{18}$ has been released, the springs $l^{11}$ will hold the forks $l$ inwardly to cause both clutches $e^5$ to be coupled to the pinions $e^6$, so that both crawlers will be driven from the shaft $g^4$. When it is desired to drive the truck around a corner or curve while the crawlers are operative or in use, the operator will swing the lever $l^9$ to shift one of the links $l'$, $l^2$ to disengage one of the clutches $e^5$, while the other clutch remains coupled to its pinion $e$. This will cause one of the crawlers to remain stationary while the other will be operated. Reverse shift of the lever $l^9$ from its neutral position will cause the other clutch $e^5$ to be disconnected so that the truck will turn in the opposite direction. This exemplifies controlling mechanism for the crawlers which comprises a lever mounted on the deck, and by which the crawlers may be driven conjointly or individually. When the traction wheels are operative and the crawlers are raised, the clutches $e^5$ are locked in their uncoupled positions by a pair of bars $l^{20}$ and $l^{21}$ which are adapted to be pushed inwardly and locked by pins $l^{120}$.

In steering the truck while it is crawler-operated, it is necessary that the idle crawler be locked and for this purpose mechanism is provided for alternately applying the brake-bands $k'$ to the brake-drums K for the crawlers. This mechanism comprises a pair of arms $k^3$, the outer ends of which are pivoted to the brake bands $k'$ respectively; a pair of rock-shafts $k^4$ which are pivoted in the carriage-frame, and to which arms $k^3$ are respectively secured; a pair of arms $k^5$ which are fixed to the inner ends of the shafts $k^4$; a pair of links $k^6$ which are pivoted to the upper ends of arms $k^5$ and connected respectively to a stud $k^7$ which depends from a gear $k^8$ that is loosely mounted on the hub $a^4$ of the ring $a^5$ beneath the gear $l^4$; a pinion $k^9$ which is fixed to the lower end of a shaft $k^{10}$ which is vertically slidable in the deck to permit the pinion to be shifted into and out of mesh with the gear $k^8$; an arm $k^{11}$ which is fixed to the upper end of the shaft $k^{10}$; a link $k^{12}$ which is pivoted to the arm $k^{11}$; and a lever $k^{13}$ which is pivoted to the deck and connected to the link $k^{12}$. When the lever $k^{13}$ is shifted in one direction, it will rock the arm $k^{11}$ to turn the pinion $k^9$ and the gear $k^8$, so that the stud $k^7$ will operate one of the brake-bands $k'$ to apply the same to its associated brake drum K, while the other brake-bank remains released. In this manner one of the crawlers is locked while the other is driven. When the lever $k^{13}$ is shifted in the opposite direction, it will shift the stud $k^7$ to operate the other brake-band to lock the other crawler. To hold the pinion $k^9$ disengaged from the gear $k^8$ when the deck is to be rotated in the operation of the derrick, mechanism is provided for raising and lowering the shaft $k^{10}$. This mechanism comprises a grooved collar $k^{15}$ which is fixed to the shaft $k^{10}$; a fork $k^{16}$ which is connected to raise or lower said collar, a rock-shaft $k^{17}$ which is pivotally mounted on the deck and is fixed to the fork $k^{16}$; a treadle $k^{18}$ which is fixed to the rock-shaft $k^{17}$; and a latch $k^{19}$ which is adapted to hold the treadle $k^{18}$ in its lowered position to retain the pinion $k^9$ disengaged from the gear $k^8$. The aforesaid mechanism exemplifies means for individually controlling the brakes for the crawlers in steering, which means is operable from the rotatable deck. The stud $l^3$ on the gear $l^4$ passes through an arcuate slot $k^{20}$ in the gear $k^8$.

When the truck is supported by the traction wheels and the crawlers are raised, the lower reaches usually sag, and to prevent the shoes $e$ of the lower reaches from dragging on the ground, devices are provided for holding these shoes elevated. For this purpose, laterally projecting ribs $m$ are formed at the inner and outer sides of the shoes $e$. These devices, in desired number, are provided for each crawler. Each device comprises a pair of hook-bars $m^2$ which are adapted to pass under the ribs $m$ on several of the shoes and to hold such shoes from sagging. The hook-bars $m^2$ are arranged to swing oppositely, are fixed to levers $m^3$ fulcrumed on the frame-members E', and have inwardly extending slotted arms $m^4$ which are connected to the lower end of a screw $m^5$. A hand-wheel $m^6$ is rotatably mounted in the adjacent frame-member E' and is threaded to the screw $m^5$ so that the screw may be operated to swing the levers $m^3$ and the hooks $m^2$ into and out of operative relation to the ribs $m$. A spring-pressed latch $m^7$ is adapted to lock each hand-wheel $m^6$ against rotation. When the crawlers are on the ground, the bars $m^2$ can be swung into position by the manipulation of the hand-wheel $m^6$ to hook under the ribs $m$ on the shoes, so that when the crawlers are raised, the shoes of the lower reaches will be lifted with the crawler-frame and held against sagging. When the crawlers are operative on the ground, the bars $m^2$ will be swung outwardly, so they will not prevent the shoes from following any irregularities in the ground over which they are travelling.

In operation, the crawlers E will be held in their raised positions by the cranks $f'$ on the crank-shafts F when the truck is travelling on a track or rails $d$. The traction-wheels can then be driven to propel the truck along the rails, by the driving mechanism which is adapted to be driven by the motor on the rotatable deck on which the derrick is mounted. When the truck is to be operated over ground on which rails have not or can not be laid, the operator will shift the controller $f^{17}$ to couple the clutch $f^9$ to the bevel gear $f^{10}$, so that gears $f^{12}$, shaft $f^{13}$, worms $f^{15}$, and worm-gears $f^{16}$ will be operated to turn the cranks $f'$ through an arc of approximately 180°. This will lower the crawlers so the traction wheels D will be off the rails and the truck will be supported on the crawlers. The crawlers can then be operated to propel the truck under the controlling and steering mechanism heretofore described. When it is desired to again operate the truck on the rails, the crank-shafts F will be rotated in the reverse direction through the driving of the shaft G in the reverse direction from the motor on the deck, until the crawlers have been raised to clear the ground and the traction wheels are on rails d.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. A truck comprising in combination a frame structure, a deck rotatably mounted on the frame structure, traction wheels for the truck, crawlers for the truck, mechanism for driving the traction wheels, mechanism for driving the crawlers, and mechanism actuated from the deck for relatively adjusting the crawlers and the wheels to position either the crawlers or the traction wheels for supporting the truck.

2. A truck comprising in combination a frame structure, a deck rotatably mounted on the frame structure, traction wheels for the truck, crawlers for the truck, mechanism for driving the traction wheels operable from the deck, mechanism for driving the crawlers also operable from the deck, and mechanism actuated from the deck for relatively adjusting the crawlers and the wheels to position either the crawlers or the traction wheels for supporting the truck.

3. A truck comprising in combination a frame structure, a deck rotatably mounted on the frame structure, traction wheels for the truck, crawlers for the truck, mechanism for driving the traction wheels operable from the deck, mechanism for driving the crawlers operable from the deck, mechanism for relatively adjusting the crawlers and the wheels to position either the crawlers or the traction wheels for supporting the truck, and mechanism operable from the deck for controlling the crawlers for steering the truck.

4. A truck comprising in combination a frame structure, a deck rotatably mounted on the frame structure, traction wheels for the truck, crawlers for the truck, mechanism for driving the traction wheels, mechanism for driving the crawlers, mechanism for relatively adjusting the crawlers and the wheels to position either the crawlers or the traction wheels for supporting the truck, and means for separately controlling the crawlers, comprising a lever mounted on the deck.

5. A truck comprising in combination a frame structure, a deck rotatably mounted on the frame structure, traction wheels for the truck, crawlers for the truck, mechanism for driving the traction wheels, mechanism for driving the crawlers, and mechanism actuated from the deck for shifting the crawlers relatively to the frame structure to position the wheels or the crawlers for supporting the truck.

6. A truck comprising in combination a frame structure, a deck rotatably mounted on the frame structure, traction wheels for the truck, crawlers for the truck, mechanism for driving the traction wheels operable from the deck, mechanism for driving the crawlers also operable from the deck, and mechanism for shifting the crawlers relatively to the frame structure to position the wheels or the crawlers for supporting the truck.

7. A truck comprising in combination a frame structure, a deck rotatably mounted on the frame structure, traction wheels for the truck, crawlers for the truck, mechanism for driving the traction-wheels, mechanism for driving the crawlers, mechanism for shifting the crawlers relatively to the frame structure to position the wheels or the crawlers for supporting the truck, and mechanism for separately controlling the crawlers for steering, comprising a lever mounted on the deck.

8. A truck comprising in combination a frame structure, traction wheels for the truck, crawlers for the truck, mechanism for driving the traction wheels, mechanism for driving the crawlers, and mechanism for shifting the crawlers relatively to the frame structure to position them for supporting and propelling the truck, comprising shafts journalled in the frame structure and provided with cranks for supporting the crawlers and gearing for rotating the shafts.

9. A truck comprising in combination a frame structure, a deck rotatably mounted on the frame structure, traction wheels for the truck, crawlers for the truck, mechanism for driving the traction wheels operable from the deck, mechanism for driving the crawlers operable from the deck, and mechanism for shifting the crawlers relatively to the frame structure to position them for supporting and propelling the truck, comprising shafts journalled in the frame structure and provided with cranks for supporting the crawlers, and gearing actuated from the deck for rotating the shafts.

10. A truck comprising in combination a frame structure, a deck rotatably mounted on the frame structure, traction wheels for the truck, crawlers for the truck, mechanism for driving the traction wheels, mechanism for driving the crawlers, crank-shafts for relatively shifting the wheels and crawlers to position them for supporting and propelling the truck, and mechanism operable from the deck for rotating the crank-shafts.

11. A truck comprising in combination a frame structure, a deck rotatably mounted on the frame structure, traction wheels for the truck, crawlers for the truck, mechanism for driving the traction wheels, mechanism for driving the crawlers, a vertical shaft concentric with the axis on which the deck swings connected to operate the driving mechanisms for the traction wheels and the crawlers, and clutch-controlled mechanism driven by the shaft for relatively shifting the wheels and crawlers to position them for supporting and propelling the truck.

12. A truck comprising in combination a frame structure, a deck rotatably mounted on the frame structure, traction wheels for the truck, crawlers for the truck, mechanism for driving the traction wheels, mechanism for driving the crawlers, a vertical shaft concentric with the axis on which the deck swings for operating the driving mechanisms for the traction wheels and the crawlers, and clutch-controlled mechanism driven by the shaft for shifting the crawlers relatively to the frame structure to position them for supporting and propelling the truck.

13. A truck comprising in combination a frame structure, a deck rotatably mounted on the frame structure, traction wheels for the truck, crawlers for the truck, mechanism for driving the crawlers, a vertical shaft concentric with the axis on which the deck swings connected to operate the driving mechanisms for the traction wheels and the crawlers, mechanism for relatively shifting the wheels and crawlers to position them for supporting and propelling the truck, and means for separately controlling the crawlers, comprising a lever mounted on the deck.

14. A truck comprising in combination a frame structure, a deck rotatably mounted on the frame structure, traction wheels for the truck, crawlers for the truck, mechanism for driving the traction wheels, mechanism for driving the crawlers, a vertical shaft concentric with the axis on which the deck swings for driving the driving mechanisms for the traction wheels and the crawlers, mechanism for relatively shifting the wheels and crawlers to position them for supporting and propelling the truck, brakes for the crawlers, and means for separately controlling the brakes, comprising a lever mounted on the deck.

15. A truck comprising in combination a frame structure, traction wheels for the truck, crawlers for the truck, mechanism for driving the traction wheels, mechanism for driving the crawlers, mechanism for relatively adjusting the crawlers and the wheels to position either the crawlers or the traction wheels for supporting the truck, and means for supporting the lower reaches of the crawlers intermediate their ends when they are raised off the ground.

16. A truck comprising in combination a frame structure, traction wheels for the truck, crawlers for the truck, mechanism for driving the traction wheels, mechanism for driving the crawlers, mechanism for relatively adjusting the crawlers and the wheels to position either the crawlers or the traction wheels for supporting the truck, and pivoted bars for supporting the lower reaches of the crawlers intermediate their ends when they are raised off the ground.

17. A truck comprising in combination a frame structure, traction wheels for the truck, crawlers for the truck, mechanism for driving the traction wheels, mechanism for driving the crawlers, mechanism for relatively adjusting the crawlers and the wheels to position either the crawlers or the traction wheels for supporting the truck, bars for supporting the lower reaches of the crawlers intermediate their ends when they are raised off the ground, and means for shifting the bars into and out of operative position.

Signed at Chicago, Illinois, this 30th day of September, 1929.

EDWARD V. CULLEN.
ALBERT G. A. SCHMIDT.